United States Patent Office 3,475,366
Patented Oct. 28, 1969

3,475,366
HYDROXYL SUBSTITUTED LINEAR THERMO-PLASTIC VINYL COPOLYMERS, COATING COMPOSITIONS, AND PROTECTIVE COATINGS CONTAINING SAME
David A. Borovicka and William E. Reich, Cleveland, and Ivor Pratt, Berea, Ohio, assignors, by mesne assignments, to SCM Corporation, New York, N.Y., a corporation of New York
No Drawing. Filed Apr. 28, 1966, Ser. No. 545,837
Int. Cl. C08f *37/16;* C09d *3/74*
U.S. Cl. 260—32.8
16 Claims

ABSTRACT OF THE DISCLOSURE

A novel class of hydroxyl substituted linear thermoplastic vinyl copolymers, coating compositions repaired therefrom and improved novel coatings are described.

The linear thermoplastic copolymers are the reaction products of a hydroxyalkyl polyether ester of an unsaturated carboxylic acid, a vinyl or vinylidene halide, and optionally an unsaturated carboxylic acid or an ester of an unsaturated lower alcohol or mixtures thereof. Such products can be blended and reacted with epoxides and polyamine-containing compounds to form heat curable coating compositions and result in coatings having improved properties.

The invention is advantageous in that novel coating compositions and coatings containing one or more of the linear thermoplastic copolymers form improved, inert, adherent coatings on a variety of substrates, particularly metal substrates (e.g., metal food container cans) when heat cured and can be applied as a single application to surfaces of conventional food container materials.

---

The invention relates to a novel class of linear thermoplastic vinyl copolymers and to an improved novel coating composition containing one or more of the copolymers. The invention further relates to coated articles such as food containers having a heat cured thermoset coating of the coating composition on at least one side of the article.

The invention is advantageous in that a novel coating composition, containing one or more of the linear thermoplastic vinyl copolymers, forms improved inert, adherent coatings on a variety of substrates, particularly metal substrates, when heat cured.

The liquid coating compositions are unique in that they can be applied as a single application or coat to the surfaces of conventional food container materials such as, for example, aluminum, black iron, tinplate and the like. Effective prior art food container coatings usually require a two-coat application, generally a base coat such as polybutadiene and a vinyl top coat.

When a liquid coating composition falling within the scope of this invention is so applied (e.g. as a single coat) and the coated containers or container materials are heat cured, the resultant cured coatings are adherent, inert and withstand the pasteurization processing treatments commonly employed in sanitary food packaging (e.g. the coatings retain their adherence to the metal substrate, and do not otherwise decompose or disintegrate). Also, the coatings have an immaterial effect on the flavor, color, or consistency of packaged foods even after storage of food in the coated container for more than several years. The coatings may be applied to other articles such as paper or wood and are usually characterized by good adhesion, flexibility, and inertness to atmospheric and chemical reactions.

THE LINEAR THERMOPLASTIC VINYL COPOLYMER

The present invention provides, in part, a linear thermoplastic vinyl copolymer comprising the copolymerization reaction product of:

(a) A hydroxyalkyl polyether ester composition of the formula:

where R and R' are like or dissimilar hydrocarbyl groups, A is the residue of an α, β ethylenically unsaturated carboxylic acid, x represents an average of from 2 to 8, and y is an average of between about 1 and 2;

(b) From about 4 to about 120 mols of a compound selected from the group consisting of vinyl and vinylidene halides, per mol of said polyether ester; and (c) From about 0 to about 20 mols, per mol of said polyether ester, of a polymerizable compound selected from the group consisting of a lower α, β ethylenically unsaturated carboxylic acid, an ester of a monoethylenically unsaturated lower alcohol, and mixtures thereof.

Linear thermoplastic vinyl copolymers falling within the scope above-described are solid, contain reactive hydroxyl groups and, as will be hereinafter evident, can sometimes contain residual carboxylic acid groups. The copolymers are generally soluble in conventional volatile organic liquids, such as aromatic and aliphatic liquid hydrocarbons, esters, alcohols, ketones, aldehydes, and the like.

Solutions of the copolymers are film-forming. When a coating composition comprising a solution containing, in combination, a copolymer of this invention, one or more of certain hereinafter-defined polyamine-containing compounds, and a volatile organic liquid is applied to a surface as a film or coating and the coated surface is subjected to elevated temperatures (e.g. temperatures of about 300° F. to 550° F.), adherent films or coatings comprising thermoset interpolymers are formed by virtue of cross-linking of molecules of the copolymer and the polyamine-containing compound. The cured coatings provided have the properties hereinbefore-described.

The copolymers, prior to cross-linking, advantageously have an average molecular weight in the range of from about 15,000 to about 30,000, the molecular weight being regulated or controlled during polymerization by conventional methods (e.g. temperature control, monomer and catalyst concentration, etc.) known in the polymer art. Although copolymers having an average molecular weight below about 15,000 may be employed in the coating compositions of this invention, the coatings from such compositions may sometimes crack and become discontinuous. On the other hand, polymers whose average molecular weight is above about 30,000 will, when incorporated in coating compositions, sometime produce coating compositions having disadvantageously high viscosities.

THE HYDROXYALKYL POLYETHER ESTER COMPOSITION

In the above-described formula, R and R' are preferably like hydrocarbyl groups and preferably contain between two and four carbon atoms. If R and R' contain less than two carbon atoms, the polymers containing such esters will tend to be somewhat soluble in water. On the other hand, if R and R' contain more than four carbon atoms, coatings prepared from compositions containing copolymers are sometimes uneconomical. Also, the inertness of the coatings may sometimes be adversely affected.

A as noted above is a residue of an α, β ethylenically unsaturated carboxylic acid and can be a monocarboxylic acid such as, for example, acrylic, crotonic, isocrotonic, vinyl acetic, methacrylic, tiglic, angelic, and senecioic acid or a dicarboxylic acid such as, for example, fumaric, maleic, glutaconic, citraconic, itaconic, ethidenemalonic, mesaconic, allylmalonic, propylidenemalonic, hydromuconic, pyrocinchonic, allylsuccinic, carbocarprolactonic, teraconic acids, and the like. Monocarboxylic acids which have been found to form particularly advantageous polyether ester compositions are acrylic and methacrylic acids. Dicarboxylic acids which have been found to form desirable polyether ester compositions are maleic, fumaric, and itaconic acids.

In the above formula, $x$ refers to the number of alkylene oxide groups (OR') and represents an average of from about 2 to 8, preferably an average of from 2 to 4 since polyether ester compositions containing an average of from 2 to 4 groups of, for example, ethylene oxide, propylene oxide, or butylene oxide, have been found to yield copolymers having the most advantageous properties of inertness, adhesion and flexibility.

As previously noted, $y$ is an average between about 1 and 2 and will depend upon the carboxylic acid employed. Thus, for example, if the polyether ester contains a monocarboxylic acid, $y$ will be an average of about 1. If the polyether ester compositions contain a dicarboxylic acid, $y$ will be an average of about 2. From the foregoing, it is evident that polyether ester compositions falling within the scope of the formula are actually mixtures of analogous esters containing a residue of an unsaturated carboxylic acid and varying amounts of alkylene oxide units which contain a terminal hydroxyl group or radical. Also, where a dicarboxylic acid is employed, the polyether ester will usually consist preponderantly of a diester of the acid. When the polyether ester composition is that of a dicarboxylic acid, a small proportion of the molecules in the composition may be a half ester of the dicarboxylic acid leaving small moieties of residual free carboxylic acid radicals present in the polyether ester composition. The polyether ester compositions should not contain substantial quantities of free carboxylic acids since if these are present polymers having undesirable properties (e.g. a tendency toward brittleness) will often be formed.

On hydroxyalkyl polyether ester composition which has been found to be particularly desirable for inclusion in the copolymer is an ester in which R and R' are hydrocarbyl groups containing 3 carbon atoms, A represents the residue of acrylic acid, $x$ represents an average of about 4, and $y$ an average of about 1. Another advantageous hydroxyalkyl polyether ester composition is one in which R and R' are as above-described, A is a residue of maleic acid, $x$ represents an average of about 4, and $y$ an average of about 2. Copolymers prepared from these esters, when incorporated in coating compositions which are subsequently heat cured, have been found to give thermosetting coatings having an especially advantageous combination of properties of adhesion, flexibility, and inertness.

Hydroxyalkyl polyether ester compositions falling within the scope of the above formula can be prepared by condensing 1 mol of a lower alkylene glycol such as ethylene glycol or propylene glycol with 1 mol of an ethylenically unsaturated carboxylic acid hereinbefore-described. Where the carboxylic acid is a monocarboxylic acid, the ester is converted to the polyether ester by heating the desired molar quantities of a lower alkylene oxide (e.g. ethylene, propylene, or butylene oxide) with the ester in the presence of a conventional catalyst such as boron trifluoride. Where the acid employed is a dicarboxylic acid, the reaction of 1 mol of acid per mol of glycol will result in the formation of the half ester. The half ester can then be converted to the diester by reacting 1 mol of lower alkylene oxide per mol of the half ester in the presence of a conventional organic amine such as, for example, benzyl dimethyl amine. The diester is thereafter converted to the polyether ester by reacting the desired molar quantities of lower alkylene oxide with the diester in the presence of a suitable catalyst such as, for example, boron trifluoride. Such procedure insures that the finished product will be substantially monomeric in nature (e.g. it may sometimes contain a small amount of polyether ester polymer) and will contain a minimum of free carboxylic acid radicals.

As previously noted, the copolymers of this invention are the reaction products of the above-described polyether ester compositions and contain from about 4 to about 120 mols of vinyl halide per mol of polyether ester. Examples of vinyl and vinylidene halides which may be employed include bromides, fluorides, and chlorides, vinyl chloride being preferred for economic reasons. If less than about 4 mols of halide per mol of polyether ester composition is employed, coatings prepared from resins containing such copolymers will tend to be brittle. On the other hand, if more than about 120 mols of halide per mol of polyether ester is employed in the copolymers, the coatings will tend to lose their adherent properties. Copolymers which have been found to form especially desirable coatings contain from about 10 to about 50 mols of halide per mole of polyether ester composition.

The copolymers can also contain from about 0 to about 20 mols, per mol of polyether ester composition, of a polymerizable compound or monomer selected from the group consisting of an $\alpha$, $\beta$ ethylenically unsaturated carboxylic acid, an ester of a monoethylenically unsaturated lower alcohol, and mixtures thereof. The monoethylenically unsaturated carboxylic acid, when employed as a component of the copolymer, is usually employed in the range of from about 0.2 to about 10 mols per mol of the polyether ester. In some instances, the unsaturated carboxylic acid, when copolymerized with the polyether ester and vinyl or vinylidene halide, provides polymers which confer properties of superior adhesiveness and flexibility in films or coatings prepared from coating compositions containing the polymer, than is the case when the acid is omitted. When less than about 0.2 mol of acid per mol of polyether ester is employed, there is insufficient change in the properties of films formed from the copolymer to warrant the inclusion of the acid. If more than about 10 mols of acid is employed, the resultant films or coatings can often lose their inertness.

The unsaturated carboxylic acid can be a mono- or dicarboxylic acid. Examples of $\alpha$, $\beta$ ethylenically unsaturated monocarboxylic acids include acrylic, methacrylic, crotonic, isocrotonic, vinylacetic, tiglic, angelic, and senecioic acids. Acrylic, crotonic, and methacrylic acids are preferred and, of these, acrylic acid is particularly preferred since its inclusion in coating compositions results in coatings which are especially adherent. Examples of dicarboxylic acids are those previously described in connection with the polyether ester composition.

Esters of monoethylenically unsaturated alcohols include, for example, vinyl acetate, vinyl butyrate, vinylene acetate, vinylene butyrate, vinylidene acetate, vinylidene butyrate, and the like. Of these unsaturated alcohol esters, vinyl acetate is preferred since polymers containing this ester have been found to provide coating compositions having a higher solids content because they tend to increase the solubility of the polymers in organic liquids.

As will be evident from the specific examples, the copolymers of this invention can be readily prepared by conventional solution polymerization methods in the presence of a free radical catalyst. For example, the monomeric components (e.g. the hydroxyalkyl polyether ester composition, the vinyl or vinylidene halide, the unsaturated monocarboxylic acid and the unsaturated alcohol ester when these latter two monomers are used) are charged along with organic solvents into a reactor along with any of a number of well known free radical polymerization catalysts, such as, for example, an organic peroxide such as lauroyl or benzoyl peroxide, a nitrile such as azo-bis-isobutyronitrile, an inorganic peroxide, or an inorganic per-salt. The monomer components are usually dissolved in a suitable solvent, preferably a solvent to be employed as a component in the hereinafter-described coating composition, in the amounts above-described.

The copolymers of this invention have an acid number of from about 10 to about 25 and contain significant quantities (e.g. about 0.5% of the molecular weight of the copolymer) of free reactive hydroxyl groups. The copolymers are potentially reactive by virtue of the presence of terminal (e.g. primary or secondary) hydroxy groups on the alkyl groups of the polyether ester component of the polymer.

THE COATING COMPOSITIONS

The invention further provides a liquid coating composition comprising a mixture of:

(1) From about 30 to about 50 weight percent of a linear thermoplastic vinyl copolymer falling within the class of copolymers hereinbefore-described;

(2) From about 0.5 to about 1.5 weight percent, basis the weight of the composition, of an epoxide resin;

(3) From about 5 to about 10 weight percent of a polyamine-containing compound capable of reacting with the hydroxyl groups of said vinyl copolymer;

(4) From about 0.1 to about 0.3 weight percent of a lower alkylene oxide; and (5) A volatile organic liquid.

Coating compositions containing ingredients falling within the scope of the above-described formulation, when applied as a coating to surfaces such as those of food containers, form solvent-wet films. Such films when heated to a temperature in the range of from about 300° F. to about 550° F. will loose solvent and cure to form coatings having properties which heretofore could only be obtained by a two coat application (e.g. a polybutadiene base coat composition and a polyvinyl top coat composition). The coating compositions usually contain from about 35 to about 60 weight percent, basis the weight of the composition, of solids, the balance consisting substantially of solvent. The composition solids have an acid number of from about 10 to about 25.

As previously noted, the coating compositions contain from about 30 to about 50 weight percent of an aforedefined linear thermoplastic vinyl copolymer. If the composition contains less than about 30 weight percent of the copolymer, the films will sometimes lack adhesion and will often tend to delaminate upon mechanical deformation of the container material. If the composition contains more than about 50 weight percent of the copolymer, the films will often have a tendency to lose their adherent qualities, particularly during pasteurization of the coated food container.

The coating composition also contains from about 0.5 to about 1.5 weight percent of an epoxide resin. A wide variety of such resins can be used, but particularly advantageous resins are liquid low molecular weight epoxy hydroxy polyether resins including, for example, the bisphenol/epichlorhydrin type or the glycerol/epichlorhydrin epoxy resins of commerce. Advantageous epoxy resins has 1,2 epoxy groups and are capable of cross-linking reactions with the hydroxyl groups of the vinyl copolymers when heated. They also react with any residual carboxyl groups which happen to be present in the copolymer.

The coating compositions of this invention also contain from about 5 to about 10 weight percent of a low molecular weight polyamine-containing compound which is also capable of reacting with the hydroxyl groups of the vinyl copolymer. A variety of such polyamine-containing compounds can be employed, including for example, low molecular weight urea/aldehyde resins, specifically urea/formaldehyde resins; melamine/aldehyde resins, benzoguanamine/aldehyde resins, alkylated melamines such as hexamethylol melamine, hexaethylol melamine, etc. Of these polyamine-containing materials, alkylated melamines have been found to be particularly useful in the coating compositions of this invention since they provide storage-stable liquid compositions which generally cross-link with the linear vinyl copolymer only when heat cured to form resilient adhesive inert coatings.

The amount of polyamine-containing material employed will vary within the aforedefined ranges and will generally depend upon the particular compound employed. In the case of polyamine-containing aldehyde low molecular weight resins, from 8 to 10 weight percent of such resins are usually used. When alkylated melamines are employed, the range is advantageously from about 5 to about 8 weight percent. If less than about 5 weight percent of the polyamine-containing material is employed, heat cured coatings formed from the compositions will tend to be brittle and inflexible. If more than about 10 weight percent of the polyamine is used, the coatings will tend to lose their inert properties, presumably due to the presence of unreacted polyamines in the coatings.

The coating compositions also contain from about 0.1 to about 0.3 weight percent of a lower alkylene oxide such as for example, ethylene oxide, propylene oxide, butylene oxide, or the like. The alkylene oxides are employed as stabilizers; that is, they tend to prevent the coating compositions from polymerizing during storage and prior to the formation of films and the application of heat. Although lower alkylene oxides may sometimes be omitted where there is little danger of coating compositions encountering storage conditions at elevated temperatures (e.g. above 100° F. or more), they tend to prevent reaction between the copolymer and polyamine-containing compounds even at temperatures below 100° F. If less than about 0.1 weight percent of lower alkylene oxide is employed, little stabilization will result. On the other hand, if more than 0.3 weight percent of lower alkylene oxide is employed, the films will tend to lose their inert properties and continuity due to the leaching out of unreacted alkylene oxide from the films.

The balance of the coating composition of this invention consists substantially of volatile organic liquids which are inert with respect to reaction with the other components of the coating composition.

Almost any of a wide variety of conventional organic liquids can be employed provided the liquids are substantially non-reactive with the formulary film-forming components and further provided that the formulary components other than the liquids are soluble or dispersible in the liquids. Preferred liquids are those which have vapor pressures and evaporation rates such that substantially all liquid phase is removed from the film during the heat curing procedure.

Volatile organic liquids which can be employed include aliphatic and aromatic hydrocarbons, alcohols, esters, ketones, and the like. Examples of aliphatic hydrocarbons include hexane, heptane, nonane, undecane, dodecane, and mixtures of these such as, for example, petroleum ether or ligroin. Examples of alcohols include methylethylpropyl, isopropyl, butyl, t-butyl, and sec-butyl alcohols. Examples of Ketones include acetone, propanone, butanone, methylethyl ketone, methylbutyl ketone, methylisobutyl ketone, ethylbutyl ketone, and the like. Examples of aromatic hydrocarbons include benzene, naphthalene, anthracene, 1,2 dimethyl benzene, 1,3 dimethyl benzene, 1,4 dimethyl benzene, 1,2,3-trimethyl benzene, 1,2,4-trimethyl benzene, 1,3,5-trimethyl benzene, alpha-methyl naphthalene, β-methyl naphthalene, toluene, etc., and the corresponding nitro- and halo-substituted derivatives. Examples of aromatic alcohols include benzyl alcohol, phenyl ethanol, etc.; examples of ketones include acetophenone, and the benzo- and naptho-quinones. Of the foregoing liquids, methylethyl ketone, methylisobutyl ketone, toluene, or mixtures of these are particularly preferred because of their optimum evaporation rates prior to and during the curing of films applied to metal substrates. These liquids are also preferred because of their lack of toxicity over other volatile organic liquids.

The particular solvent or solvent combination employed in the coating compositions will depend upon the desired method of application. By way of example, if it is desired to apply a coating composition to a surface by means of a brush or a roller, a mixture of methylisobutyl ketone and xylene in approximately equal weight quantities (e.g. from 40 to 60 or 60 to 40 weight percent) has been found to be desirable. Where the coating compositions are applied to a surface in the form of an aerosol, a mixture of methylethyl ketone and toluene (in the same range of proportion) has been found to be most advantageous.

Coating compositions falling within the scope of this invention can be prepared by blending the various solid components (e.g. vinyl copolymer, epoxide resin, polyamine-containing compound, and lower alkylene oxide) in any order in amounts within the ranges hereinbefore-described into one or more of the aforementioned volatile organic liquids until substantially complete dispersion or solution occurs. This process is somewhat less advantageous than others in that it involves the expensive steps of forming and recovering the solid vinyl copolymer.

Alternatively, the coating compositions can be prepared by a process wherein the vinyl copolymer is polymerized using conventional solvent polymerization procedures in one or more of the volatile organic liquids of the coating composition. After the copolymer is formed, and while still in solution, the remainder of the formulary components are added to the copolymer solution.

An especially advantageous and preferred process for producing a coating composition of this invention comprises the steps of:

(1) Forming a solution comprising a major proportion of the volatile organic liquid having dissolved therein the aforedefined polyether ester composition and vinyl or vinylidene halide in unreacted form. The volatile organic liquid also contains at least a portion of the epoxide resin component;

(2) Reacting the polyether ester composition with the vinyl or vinylidene halide at a temperature in the range of from about 100° F. to 185° F. in the presence of a free radical catalyst in an amount insufficient to completely react the ester composition and the vinyl or vinylidene halide, thereby forming an intermediate reaction product consisting of partially formed vinyl copolymer.

(3) Subsequently completing the reaction between the ester composition and the halide at a temperature within the range above-defined and in the presence of additional catalyst, thereby producing a resultant solution of the vinyl copolymer containing the epoxide resin;

(4) Cooling the resultant solution to a temperature below 100° F.; and (5) Thereafter blending into the resultant solution the balance of the epoxide resin, the polyamine-containing compound, and the lower alkylene oxide.

By so proceeding, it has been found possible to prepare reproducibly superior coating compositions which yield heat cured coatings which do not crack, delaminate, or affect the flavor of the foods in contact with the heat cured coating.

The foregoing procedure is advantageous in that it permits the coating compositions to be manufactured batch wise, in a semi-continuous or in a continuous manner, and mitigates adverse effects such as partial decomposition of the vinyl or vinylidene halide monomer which sometimes occurs due to the exotherm accompanying the copolymer formation. Copolymers prepared in situ in the manner above-described have a narrower average molecular weight range (e.g. an average molecular weight range of from about 20,000 to 25,000), and the copolymer is composed of molecules which are more uniform than copolymers obtained from other processes.

In a preferred embodiment of the process of this invention, from between about 60 to 80 weight percent of the total solvent to be employed is charged to a reaction zone along with between about 25 and 35 weight percent of the total epoxide resin component to be employed is dissolved in the solvent. The epoxide resin, as previously noted, is a stabilizer and is believed to function by consuming hydrogen halide which is sometimes produced through decomposition of small amounts of the vinyl or vinylidene halide during the reaction between that monomer and the polyether ester composition. When an ester of an unsaturated alcohol (aforedefined) is employed in the composition, this material is also added to the solvent initially charged to the reaction zone. Thereafter, from about 15 to 25 weight percent of the total amount of vinyl or vinylidene halide to be employed is charged to the reaction zone. There is thus formed a solution containing the solvent, epoxide resin, unsaturated alcohol ester (when used), and vinyl or vinylidene halide. To this solution, there is simultaneously added over a period of from 2 to 10 hours:

(1) A solution consisting of from about 15 to about 25 weight percent of the solvent to be employed, substantially all of the $\alpha, \beta$ ethylenically unsaturated monocarboxylic acid (when this material is used), and from about 60 to about 70 weight percent of the catalyst to be employed; and (2) The remainder of the vinyl or vinylidene halide.

By so proceeding, there is formed in the reaction zone the aforementioned intermediate reaction product consisting of the partially formed vinyl copolymer.

If more than about 70 weight percent of the lauroyl peroxide is employed in the above process step, the temperature in the reaction zone may sometimes rise to above 175° F. often causing decomposition of a small portion of the vinyl or vinylidene halide and yielding copolymers having a wider average molecular weight range. If less than about 60 weight percent of the catalyst is employed, the intermediate reaction product can sometimes contain undesirably large quantities of unreacted vinyl or vinylidene halide. If the materials (e.g. the solution and the vinyl or vinylidene halide) are introduced too rapidly; that is, over a period of less than about two hours, the temperature of the contents of the reaction zone will rise above 175° F. and result in the disadvantages above-described. If the materials are introduced over a period of more than six hours, production times for the coating compositions will be uneconomically prolonged.

The balance of the catalyst dissolved in a small amount, usually from about 4 to about 8 weight percent, of the solvent is then added to the reaction zone over a period of from about ½ to 2 hours. The balance of the solvent is then added to the reaction zone, the reaction is completed and the vinyl copolymer is formed in solution in the solvent. The contents of the reaction zone are subjected to vigorous agitation for about one to three hours. The remaining components (e.g. the balance of the epoxide resin, the polyamine-containing compound, and the lower alkylene oxide) are then blended into the solution. If the temperature of the solution is above about 100° F., some curing (e.g. cross-linking) of the polyamine-containing compound and the copolymer may sometimes occur.

Any of the coating compositions of this invention, when applied to metal, or other substrates and heated, undergo a cross-linking reaction; that is, the linear thermoplastic vinyl copolymer reacts with the polyamine-containing compound to provide thermosetting coatings which have the desirable properties hereinbefore-described. Such coatings are from about 0.05 to about 0.30 mil in thickness. The thickness is usually dependent upon the percent solids (e.g. copolymer, polyamine-containing compound, etc.) as well as the method by which the coating is applied. As noted previously, the coating compositions of this invention can contain from about 30 to about 50 weight percent, basis the weight of the composition, of solid components and the thickness of the composition will generally correspond to the solids present (e.g. the higher the solids content, the thicker the dried coating). The coating compositions are advantageously heat cured at a temperature between 300° F. and 550° F. If temperatures below 300° F. are employed, curing times will be unnecessarily prolonged. Curing temperatures above 550° F. are generally uneconomical and may sometimes decompose a portion of the formulary components prior to the completion of the curing resulting in films having undesirable characteristics.

The following specific examples are intended to illustrate the invention, but not to limit the scope thereof, parts and percentages being by weight unless otherwise specified.

Example 1

Three-hundred-and-fifteen pounds and propylene glycol were charged into a closed reactor equipped with heating and cooling coils and a mechanical agitator. The charge was heated to 155° F. after which 406.2 pounds of maleic anhydride were introduced into the reactor with agitation over a period of 30 minutes. An exotherm, produced during addition of the maleic anhydride, was controlled by cooling. The reactor contents were maintained at 170° F. throughout the addition of the maleic anhydride. The agitation was continued until production of the exotherm ceased. The reaction product formed consisted substantially of the propylene glycol half ester of maleic anhydride. The reaction product was then heated in the reactor to 200° F. and 2.6 pounds of benzyldimethylamine were added to and mixed with the contents of the reactor. Thereafter, under continuous agitation conditions, a 120 pound increment of propylene oxide was added over a two hour period followed by the addition of a second 120 pound propylene oxide increment under the same conditions (e.g. two hours while the reactor conditions were maintained at 200° F.). The contents of the reactor were then heated and maintained at 250° F. while a 24 pound increment of propylene oxide was charged to the reactor over a 20 minute period. Thereafter, an additional 20 pound increment of propylene oxide was charged and 30 pounds of toluene added. The reactor contents consisted substantially of a mixture of the propylene glycol diester of the maleic acid and toluene. The product so obtained was distilled at a pressure of 10 mm. of mercury for 45 minutes at its boiling point. After the contents of the distillation apparatus were nitrogen purged, the product was further distilled at 190° F. to remove residual toluene. The contents were then cooled and removed from the apparatus. Nine-hundred-forty-six pounds of a reaction product consisting substantially of di-(hydroxypropyl)maleate were obtained. The product had an acid number of 47, contained 12% hydroxyl groups, and had a density of 9.86 pounds per gallon.

Two-hundred-eighty-five pounds of this reaction product were charged to a substantially identical reactor along with 65 pounds of xylene. Ten pounds of xylene and 14 ounces of boron trifluoride etherate were then introduced with agitation into the reactor. Immediately thereafter, 1.75 pounds of boron trifluoride etherate (47% BF$_3$) and 553 pounds of propylene oxide were introduced over a period of four hours. As the propylene oxide was added, the temperature of the contents of the reactor increased to above 100° F. and the contents of the reactor were controlled at a temperature of below 105° F. by cooling. Substantially eight molar equivalents of propylene oxide were added per mol of the diester. Thereafter, 30 pound of xylene were charged and the resultant mixture heated to 170° F. for five minutes. The reactor contents were then cooled to 90° F. and 260 pounds of a mixture consisting of 200 pounds xylene and 60 pounds toluene were added. The contents of the reactor were then agitated for 30 minutes after which 1120 pounds of de-mineralized water were added to the reactor in four equal increments and mixed while agitation was continued. After each addition, the water was permitted to settle and removed through the valve at the bottom of the reactor. The contents of the reactor were then distilled under vacuum at a temperature between 100° F. and 150° F. until all of the water was removed. The apparatus was then purged with nitrogen and additional xylene and toluene added to provide a solution containing 750 pounds of a product consisting of di-(hydroxypropyl, polypropyl ether) maleate composition dissolved in 500 pounds of solvent. The solution contained 60% non-volatiles (e.g. the di-(hydroxypropyl, polypropyl ether) maleate composition), had hydroxyl value of 4.5% and an acid number of 9.

Example 2

The procedure of Example 1 was repeated, except that itaconic acid was employed in place of the maleic anhydride (and the corersponding glycol ester of maleic acid) employed in that example. By so proceeding, a di-($\beta$-hydroxypropyl, polypropyl ether) itaconate composition comprising a mixture of analogous itaconic acid esters was formed.

Example 3

Into a closed reactor vessel there was added 100 grams of vinyl chloride, 50 grams of the di-(hydroxypropyl, polypropyl ether) maleate composition prepared in Example 1, 3.5 grams of acrylic acid, 50 grams of methylisobutyl ketone, and 60 grams of xylene. The closed pressurized reactor vessel was then sealed. Into a separate pressurized reactor vessel there was added 7 grams of lauroyl peroxide, 120 grams of methylisobutyl ketone, 104 grams of xylene, 65 grams of vinyl chloride, 38 grams of the di-(hydroxypropyl, polypropyl ether) maleate composition, and 22 grams of vinyl acetate. The contents of the second reactor vessel were heated to 150° F. and held at this temperature for 30 minutes. After this period, the contents of the first reactor vessel were slowly pumped into the second reactor vessel over a 3⅓ hour period while the temperature in the second reactor vessel was maintained at 150° F. The temperature was maintained (after the addition of the contents of the first reactor vessel) for 18 hours after which the contents of the vessel were cooled and filtered. The resulting resin had an average molecular weight of 16,000, an acid value of 15, contained 1.1 weight percent of hydroxyl groups and was set aside for formulation into the coating composition desribed in Example 5.

Example 4

The procedure of Example 3 was repeated, except that the itaconate ether ester was employed in place of the maleate ether ester employed in that example. The itaconate residue was set aside for use in formulating the coating composition shown in Example 6.

Example 5

To 1000 grams of the linear thermoplastic vinyl copolymer, prepared as in Example 3, there was added 25 grams of bisphenol/epichlorhydrin resin having a hydroxyl equivalence of 80 and an epoxide equivalence of 192 (sold under the trademark of "DER" 332 by Dow Chemical Company), 250 grams of hexamethylol melamine (supplied under the trademark "CYMEL" 301 by the American Cyanamid Corporation), 1900 grams of a 50–50 weight ratio mixture of methylisobutyl ketone and xylene to provide a coating composition consisting substantially of 40% solids (e.g. non-volatile material) and 60% of solvent. The resultant composition was applied to a one foot square surface of unprimed tinplate which was baked at 325° F. for six minutes. The coating produced had a thickness of 0.09 mil. After heating the resultant coating in water at the boiling point and bending the tinplate at a 90 degree angle, the film showed substantially no distortion. When a solution of the film so treated was subjected to a standardized "rub" treatment, in which a rag dampened with methylethyl ketone was rubbed over the surface, a total of 48 rub strokes were required before the film was dissolved directly to the tinplate. When a coating composition containing a polymer identical in all respects except that the methacrylic ester was employed in place of the dicarboxylic acid ester (e.g. maleate) employed in Example 5, the coating was removed by the standardized rubbing treatment after a total of 8 rub strokes.

Example 6

A coating composition substantially identical to the coating composition of Example 5 was prepared, except that the di-(β-hydroxypropyl, polypropyl ether) itaconate ester composition was employed in the resin in place of the maleate ester employed in Example 5. When coated on tinplate as described in Example 5 and the resulting tinplate heated and tested as in Example 5, a total of 44 rub strokes were required to remove the film. The coating after curing had a thickness of 0.2 mil.

Example 7

A coating composition substantially identical to that of Example 5 was prepared, except that a β-hydroxypropyl, polypropyl ether acrylate composition was employed in place of the maleate ester used in that example. When coated on tinplate as described in Example 5 and the resulting tinplate heated and tested as described in Example 5, a total of 20 rub strokes were required to alter the film. The coating had a thickness of 0.1 mil.

When linear thermoplastic vinyl copolymers containing di-hydroxy ethyl polyethyl ether maleate or itaconate ester compositions are substituted, the di-(hydroxypropyl, polypropyl ether) itaconate or maleate employed as in Examples 3–6, coated films having substantially the same characteristics are obtained.

Example 8

To a 20 gallon pilot plant reactor equipped with mechanical agitator, heating and cooling coils, there was added 21.4 pounds of methylethyl ketone, 12.05 pounds toluene, 3.59 pounds vinyl acetate, and 0.35 pound of "Epon" 828 (a low molecular weight epoxide resin sold by Shell Oil Company). To this solution, there was added with agitation 4.73 pounds of vinyl chloride. The contents of the reactor were held at 150° F. and there was added to the reactor over a six hour period a solution consisting of 2.14 pounds of methylethyl ketone, 7.02 pounds of toluene, 13.67 pounds of the di-(hydroxypropyl, polypropyl ether) maleate ester composition prepared in Example 1, 0.55 pound of acrylic acid and 0.65 pound of lauroyl peroxide. Simultaneously, 19.05 pounds of vinyl chloride was added to the reactor over the same period of time.

After the addition, the contents of the reactor were stirred for 15 minutes and there was then added a solution consisting of 3.41 pounds of toluene and 0.34 pound of lauroyl peroxide. During the addition of the lauroyl peroxide, the temperature of the reactor rose rapidly and was maintained at 150° F. + or −5° F. with constant agitation. There was then added to the reactor, over a two hour period, a mixture of 1.27 pounds of methylethyl ketone and 1.12 pounds of toluene while the temperature of the reactor was maintained at 160° F. Polymerization was then complete and the reaction product was stripped of residual unreacted monomers. Thereafter, there was added while agitation was continued, 0.75 pound of "Epon" 828, 7.99 pounds of "Cymel" 300 (a low molecular weight hexylmethylol melamine product sold by American Cyanamid Company), and 0.26 pound of propylene oxide. The material was filtered using a convention filter aid (e.g. Supercel) and evaluated and was found to consist of 40% solids, had a Gardner color of 3, an acid number of 5, and contained 0.4 percent hydroxyl groups. The material was applied to tinpale and heated at a temperature of 325° F. for 10 minutes. The coatings formed had thicknesses of 0.2 mil, were thermosetting, and when evaluated according to the procedure described in Example 5, required a total of 80 rub strokes to alter the surface of the film.

In Example 8, the linear thermoplastic vinyl copolymer is formed in situ during the formulation of the coating composition. The temperature rise which accompanies the exothermic reaction, inherent in the formation of the copolymer, is susceptible to control within a narrower range of temperature. Using this procedure, it is possible to prepare coating compositions which provide more predictably uniform coatings.

What is claimed is:

1. A linear thermoplastic vinyl copolymer having a molecular weight between about 15,000 and about 30,000 and comprising the copolymerization reaction product of:
   (a) a hydroxyalkyl polyether ester composition of the formula:

where R and R' are like or dissimilar hydrocarbyl groups, A is the residue of an α,β-ethylenically unsaturated carboxylic acid, x represents an average of from 2 to 8, and y is an average of from 1 to 2;
   (b) from about 4 to about 120 mols of a compound selected from the group consisting of vinyl and vinylidene halides per mol of said polyether ester; and
   (c) from about 0 to about 20 mols, per mol of said polyether ester, of a polymerizable compound selected from the group consisting of a lower α,β-ethylenically unsaturated carboxylic acid, an ester of a monoethylenically unsaturated lower alcohol, and a mixture thereof.

2. The hydroxyalkyl polyether ester composition of claim 1 wherein A is a residue of an α,β-ethylinically unsaturated dicarboxylic acid.

3. The copolymer of claim 2 wherein A is a residue of maleic acid and R and R' are like hydrocarbyl groups containing from 2 to 4 carbon atoms.

4. The copolymer of claim 2 wherein x is an average from about 3 to about 5, and y is an average of about 2.

5. The copolymer of claim 4 wherein R and R' are hydrocarbyl groups containing 3 carbon atoms.

6. The copolymer of claim 1 wherein the vinyl or vinylidene halide is vinyl chloride and wherein the polymerizable compound is acrylic acid.

7. The copolymer of claim 1 wherein the polymerizable compound is vinyl acetate.

8. The copolymer of claim 1 wherein the polymerizable compound is a mixture of acrylic acid and vinyl acetate.

9. The copolymer of claim 1 wherein the amount of vinyl or vinylidene halide present in said copolymer is from about 10 to about 50 mols of vinyl chloride per mol of said polyether ester and wherein the polymerizable compound consists essentially of a mixture containing from about 2 to about 10 mols of vinyl acetate per mol of said polyether ester, said copolymer having an average molecular weight in the range of from about 15,000 to about 30,000.

10. A heat curable coating composition comprising a mixture of:
   (1) from about 30 to about 50 weight percent of a vinyl copolymer having a molecular weight between about 15,000 and about 30,000 and comprising the copolymerization reaction products of:
      (a) a hydroxyalkyl polyether ester composition of the formula:

where R and R' are like or dissimilar hydrocarbyl groups, A is the residue of an α,β-ethylenically unsaturated carboxylic acid, x represents an average of from 2 to 8, and y is an average of from 1 to 2;
      (b) from about 4 to about 120 mols of a compound selected from the group consisting of vinyl and vinylidene halides, per mol of said polyether ester; and (c) from about 0 to about 20 mols, per mol of said polyether ester, of a polymerizable compound selected from the group consisting of a lower α,β-ethylenically unsaturated carboxylic acid, an ester of a monoethylenically unsaturated lower alcohol, and a mixture thereof;

(2) from about 0.5 to about 1.5 weight percent, basis the weight of the composition, of a low molecular weight epoxide resin having 1 to 2 epoxide groups;

(3) from about 5 to about 10 weight percent of a polyamine-containing compound having a low molecular weight capable of reacting with the hydroxyl groups of said vinyl copolymer;

(4) from about 0.1 to about 0.3 weight percent of a lower alkylene oxide; and (5) a volatile organic liquid diluent.

11. The composition as in claim 9 wherein the epoxide resin is a bisphenol/epichlorhydrin epoxy hydroxy polyether resin having a 1,2 epoxide equivalence up to about 525 grams.

12. The composition of claim 10 wherein the polyamine-containing compound is hexylmethylol melamine.

13. The composition of claim 10 wherein the lower alkylene oxide is propylene oxide.

14. The composition of claim 10 wherein the volatile organic liquid diluent is selected from the group consisting of methylethyl ketone, methylisobutyl ketone, toluene, and xylene.

15. A heat cured coating applied and adherent to at least one surface of a solid substrate, said coating comprising the heat cured reacting product of a liquid film comprising a mixture of:

(1) from about 30 to 50 weight percent of a vinyl copolymer having a molecular weight between about 15,000 and about 30,000 and comprising the copolymerization reaction product of:

(a) a hydroxyalkyl polyether ester composition of the formula:

where R and R' are like or dissimilar hydrocarbyl groups, A is the residue of an α,β-ethylenically unsaturated carboxylic acid, $x$ represents an average of from 2 to 8, and $y$ is an average of from 1 to 2;

(b) from about 4 to about 120 mols of a compound selected from the group consisting of vinyl and vinylidene halides, per mol of said polyether ester; and (c) from about 0 to about 20 mols, per mol of said polyether ester, of a polymerizable compound selected from the group consisting of a lower α,β-ethylenically unsaturated carboxylic acid, an ester of a monoethylenically unsaturated lower alcohol, and a mixture thereof;

(2) from about 0.5 to about 1.5 weight percent, basis the weight of the composition of a low molecular weight epoxide resin having 1 to 2 epoxide groups;

(3) from about 5 to about 10 weight percent of a low molecular weight polyamine-containing compound capable of reacting with the hydroxyl groups of said vinyl copolymer; and (4) from about 0.1 to about 0.3 weight percent of a lower alkylene oxide.

16. A process for preparing a coating composition comprising from about 30 to about 50 weight percent of a vinyl copolymer comprising the reaction product of:

(a) a hydroxylalkyl polyether ester composition;

(b) from about 4 to about 120 mols of a compound selected from the group consisting of vinyl or vinylidene halides per mol of said polyether ester;

(c) from about 0 to about 20 mols per mol of said polyether ester of a polymerizable compound selected from the group consisting of a lower α,β-ethylenically unsaturated carboxylic acid, an ester of a monoethylenically unsaturated lower alcohol, and a mixture thereof;

(d) from about 0.5 to about 1.5 weight percent basis the weight of the composition of an epoxide resin;

(e) from about 5 to about 10 weight percent of a polyamine-containing compound capable of reacting with the hydroxyl groups of said vinyl copolymer;

(f) from about 0.1 to about 0.3 weight percent of a lower alkylene oxide; and (g) a volatile organic liquid which comprises the steps of:

(1) forming a solution comprising a major proportion of said volatile organic liquid having dissolved therein said polyether ester composition, said vinyl or vinylidene halide in unreacted form, and at least a portion of said expoxide resin;

(2) reacting said polyether ester composition with said vinyl or vinylidene halide at a temperature in the range of from about 110° F. to about 185° F. in the presence of a free radical catalyst in an amount insufficient to completely react said ester composition and said vinyl or vinylidene halide thereby forming an intermediate reaction product consisting of partially formed vinyl copolymer;

(3) subsequently completing the reaction between said ester composition and said vinyl or vinylidene halide at a temperature within said range in the presence of additional catalyst thereby producing a resultant solution of said vinyl copolymer containing said epoxide resin;

(4) cooling said resultant solution to a temperature below about 100° F.; and (5) thereafter blending into said resultant solution the balance of said epoxide resin, said polyamine-containing compound, and said lower alkylene oxide.

References Cited

UNITED STATES PATENTS

| | | | |
|---|---|---|---|
| 3,017,396 | 1/1962 | Arond et al. | 260—86.3 |
| 3,284,276 | 11/1966 | Berenbaum et al. | 260—837 |
| 3,305,602 | 2/1967 | Bromstead | 260—837 |
| 3,317,483 | 5/1967 | Verdol | 260—86.3 |

OTHER REFERENCES

I.C.R. Bews, Paint Technology Manuals, Part One—Non-Convertible Coatings, Chapman & Hall, London 1961, pp. 241–46, 281–87.

F. Chevassus, & R. de Broutelles, "La Stabilisation des Chlorures de Polyvinyle," les Edition's Amphora, Paris, France (1957) pp. 116, 119, 122, 123, 127.

MORRIS LIEBMAN, Primary Examiner

L. T. JACOBS, Assistant Examiner

U.S. Cl. X.R.

260—33.6, 80.75, 86.3, 837